M. C. MALONE.
Pruning-Shears.
No. 138,338.
Patented April 29, 1873.
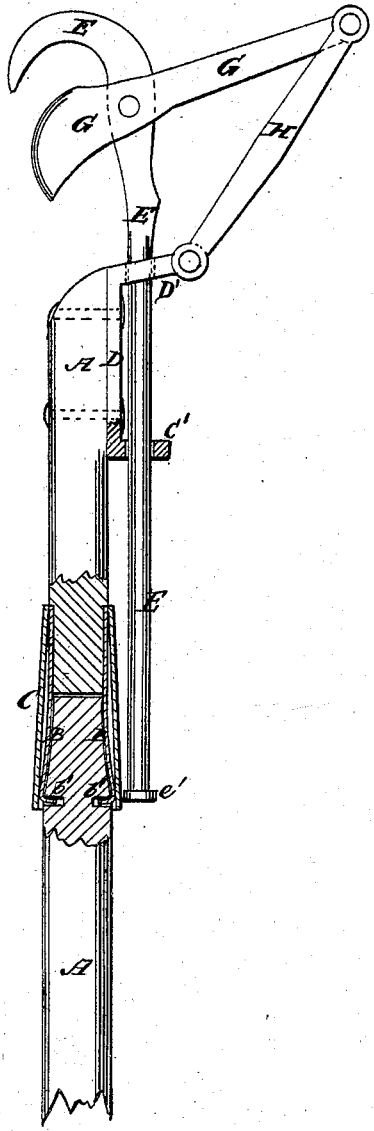
Witnesses:
E. Wolff
C. Sedgwick
Inventor:
M. C. Malone
Per
Attorneys.

UNITED STATES PATENT OFFICE.

MICAJAH C. MALONE, OF PALMYRA, ILLINOIS.

IMPROVEMENT IN PRUNING-SHEARS.

Specification forming part of Letters Patent No. 138,338, dated April 29, 1873; application filed April 5, 1873.

*To all whom it may concern:*

Be it known that I, MICAJAH C. MALONE, of Palmyra, in the county of Macoupin and State of Illinois, have invented a new and useful Improvement in Pruning-Shears, of which the following is a specification:

The figure is a side view of my improved pruning-shears, parts being broken away to show the construction.

My invention has for its object to furnish an improved pruning-shears, simple in construction, convenient in use, and effective in operation, and which shall be so constructed as to open itself when held erect, so that it may be operated by a single handle. The invention consists in the plate provided with lugs, the sliding rod, having a head formed upon its lower end and a hook upon its upper end, the pivoted blade, and the pivoted connecting bar or bars, constructed and arranged in connection with each other and a handle, as hereinafter fully described; and in the combination of the spring-hooks and the sliding band or ferrule with the adjacent ends of the sections of the handle, as hereinafter fully described.

A represents the handle, which, when required to be made long, is made in sections. To the opposite sides of the lower end of each upper section are attached two springs, B, having inwardly-projecting points, pins, or hooks $b'$ formed upon or attached to their lower ends, which are designed to enter holes in the opposite sides of the upper end of each lower section, where they are held in place, and the joint is strengthened by a band or ferrule, C, which is slipped down upon them, as shown in the figure. This construction enables the handle to be made of any required length. To the upper end of the handle A is attached a plate, D, having lugs $d'$ formed upon its outer side. E is a rod which is passed through holes in the lugs $d'$, and has a head, $e$, formed upon or attached to its lower end, to keep it from being drawn out. Upon the upper end of the rod E is formed a hook, F, to be hooked over and to hold the limb to be cut. G is the blade, which is pivoted to the upper part of the rod E, a little below the hook F, in such a position, and is so formed, that when turned upon its pivot it will operate upon the limb held by the hook F. To the rear end or shank of the blade G is pivoted the upper end of the bar or bars H, the lower end of which is pivoted to the upper lug $d'$ of the plate D. By this construction, when the shears are held erect, the weight of the rod E, hook F, and blade G will cause the rod E to slide down in the lugs $d'$, which opens the shears so that the hook F can be passed over the limb to be cut. When the hook has been passed over the limb, by pulling upon the handle A the blade G will be operated to cut off the limb.

Having thus described my invention, I claim as new and desire to secure by Letters Patent—

1. The plate D, provided with lugs $d'$, the sliding rod E, having a head, $e'$, upon its lower end and a hook, F, upon its upper end, the pivoted blade G, and the pivoted bar or bars H, constructed and arranged in connection with each other and a handle, A, substantially as herein shown and described.

2. The combination of the spring-hooks B $b'$ and the sliding band or ferrule C with the adjacent ends of the sections of the handle A, substantially as herein shown and described, and for the purpose set forth.

MICAJAH C. MALONE.

Witnesses:
C. T. HANSHAW,
WM. M. HULSE.